3,804,867
PROCESS FOR PRODUCTION OF A PEANUT OIL COMPOSITION BY HYDROGENATION AND WINTERIZATION
Chester M. Gooding, Union and Horace P. Rowley, Ridgewood, N.J., assignors to CPC International Inc.
No Drawing. Filed Aug. 13, 1971, Ser. No. 171,719
Int. Cl. C11b 7/00; C11c 3/12
U.S. Cl. 260—409                              5 Claims

ABSTRACT OF THE DISCLOSURE

A peanut oil compositoin comprising peanut oil hydrogenated to an iodine value of from about 78 to 90. This novel hydrogenated peanut oil is pourable at room temperature and exhibits improved stability at high temperatures. This hydrogenated peanut oil composition can be winterized to obtain a high stability liquid peanut oil which exhibits substantially no solids formation at room temperature.

BACKGROUND OF THE INVENTION

The field of this invention relates to peanut oil.

It is commonly known that refined vegetable oils can be useful in forming various food compositions. Such oils, for example, can be used in frying operations, or can be incorporated as an ingredient in a food product. Such oils, however can be quite unstable. For example, at the high temperatures associated with frying, especially deep fat frying, many vegetable oils do not exhibit sufficient stability such that they are suitable for use for extended periods of time. High stability vegetable oils are now widely used in commercial cooking operations. These high stability oils can be obtained by processes which involve hydrogenating vegetable oils to reduce the polyunsaturated fats in the oils. Especially suitable examples of such high stability oils are disclosed in U.S. Pat. 2,874,055 to Melnick and Gooding and U.S. Pat. 2,814,633 to Gooding. Hydrogenated peanut oil is known, for example, peanut oil hydrogenated to an iodine value of below 55 is disclosed in Industrial Oil and Fat Products, 2nd Edition by A. E. Bailey at page 752, and peanut oil hydrogenated to an iodine value of about 76 is disclosed in U.S. Pat. 2,814,055. While these particular hydrogenated vegetable oils can be desirable, they generally have such high solids content that they are solid at room temperature, or have the consistency of a thick slush.

High stability vegetable oils which are freely pourable at room temperature can be especially desirable. For example, such oils can be easily handled, i.e., they are easily transferred and measured and such oils can impart desirable qualities to the products cooked with them.

High stability vegetable oils which are pourable at room temperature are known. For example, U.S. Pat. 3,394,014 to Simmons et al. discloses high stability liquid vegetable oils obtained in a process involving hydrogenating certain liquid vegetable oils having a high content of polyunsaturated fatty acids, especially linoleic acid, to an iodine value of from 70 to 100, and carefully winterizing the hydrogenated oil to remove the resulting crystal solids. In this process among the suitable vegetable oils are, for example, soybean oil, cottonseed oil, safflower oil and corn oil. Peanut oil, however, differs from these vegetable oils.

Peanut oil has a fortuitous fatty acid composition such that it is liquid at room temperature and contains relatively small amounts of polyunsaturated fatty acids. It exhibits better stability than vegetable oils containing a higher content of polyunsaturated acids. In addition, it is known by those skilled in the art that it is not feasible to winterize peanut oil. (See for example, Industrial Oil and Fat Products, supra, at page 863.) At winterization temperatures, peanut oil generally forms a viscous gel which does not exhibit discrete crystal solids which can be removed by filtration.

A desirable peanut oil would be freely pourable at cool room temperatures, for example, a temperature as low as 70° F., and exhibit improved stability.

SUMMARY OF THE INVENTION

This invention presents a novel peanut oil composition comprising peanut oil hydrogenated to an iodine value of from about 78 to 90. It has been found that this novel hydrogenated peanut oil exhibits improved stability, and is freely pourable at 70° C. In another aspect of this invention, it has also been found that this novel hydrogenated peanut oil can be winterized such that a novel high stability liquid peanut oil can be obtained which exhibits substantially no solids formation during prolonged storage at cool temperatures. This invention also presents processes for obtaining these novel compositions.

DESCRIPTION OF THE INVENTION AND ITS PREFERRED EMBODIMENTS

This invention presents a novel peanut oil composition comprising peanut oil hydrogenated to an iodine value of form about 78 to 90. Preferably the peanut oil is hydrogenated to an iodine value of from about 80 to 85. In general, the process for obtaining the peanut oil compositions of this invention involves hydrogenating peanut oil to an iodine value of from about 78 to 90, and preferably from 80 to 85.

In general peanut oil expressed from nut kernels from the plant Arachis hypogaea are suitable for use in this invention. Preferably the peanut oil is refined, and has an iodine value of from about 93 to 97.

The peanut oil should be hydrogenated at low temperatures and pressures. Preferably, the hydrogenation is carried out at a temperature of from about 200° F. to 250° F. While higher hydrogenation temperatures can be employed, as for example temperatures up to about 30° F. can be employed, the lower temperatures are preferred in that the lower temperatures contribute to better yields of high stability oils which are liquid at room temperature. Hydrogenation pressures of about 15 to 25 p.s.i. are particularly satisfactory. Higher pressures, as for example 25 to 60 p.s.i., can be used. The higher pressures, however, can result in poorer yields of high stability oils which are liquid at cool room temperatures, and increased amounts of fat solids.

Especially suitable catalysts which can be employed in the hydrogenation procedure are the nickel-copper catalyst disclosed in U.S. Pat. 2,320,063 and the nickel catalyst disclosed in U.S. Pat. 2,424,811. Suitable amounts of catalysts are from about 0.05% to 0.3%, preferably about 0.1% to 0.2%, by weight of the peanut oil to be hydrogenated. When the peanut oil has been hydrogenated to an iodine value of 78 to 90, preferably 80 to 85, it is filtered to remove the catalyst to obtain a peanut oil composition of this invention. Preferably the resulting peanut oil composition is deodorized and bleached in order to improve its taste characteristics and color.

The resulting peanut oil compositions have an iodine value of from about 78 to about 90, are freely pourable at 70° F. and exhibit improved stability. If the peanut oil is hydrogenated lower iodine values, the amount of fat solids in the oil increases. As the solids content increases, the oil becomes less pourable. At 70° F. the peanut oil compositions of the invention can have a solids content of from about 2% to 12%, by weight, of the composition.

These solids are fat crystals of a size and nature such that with mild agitation the fat solids can be suspended in the liquid phase of the composition such that the peanut oil composition is freely pourable at 70° F. These peanut oil compositions exhibit substantially better stability than refined peanut oil in deep fat frying operations.

Vegetable oil users often prefer liquid vegetable oils which are wholly liquid, i.e., contain no solids, at room temperatures.

In another aspect of this invention, it has been found that the peanut oil composition of this invention can be winterized to obtain a high stability liquid peanut oil exhibiting substantially no solids formation during prolonged storage at a temperature of 70° F.

The process for obtaining this high stability liquid peanut oil involves (1) hydrogenating peanut oil to an iodine value of from 70 to 90; (2) cooling the resulting partially hydrogenated peanut oil to a temperature of from about 50° F. to 70° F. and (3) separating the resulting crystals to obtain the high stability liquid peanut oil.

Preferably the peanut oil is hydrogenated to an iodine value of from about 78 to 90, and most preferably to an iodine value of from 78 to 85, in a manner such as hereinbefore disclosed to be preferred for obtaining the novel peanut oil composition of this invention. Preferably the partially hydrogenated peanut oil is cooled to a temperature of from about 55° F. to 70° F. Preferably the oil is cooled relatively slowly such as, for example, over a period of from about 12 hours to 72 hours. As the oil is cooled, it is preferably slowly-stirred, for example, slowly stirred at from about ½ to 2 r.p.m. It is desirable for the oil to remain at the temperature to which it is cooled for a period of time such as, for example from about 6 to 72 hours.

After the partially hydrogenated oil is cooled the solid fat component in the oil is separated by filtration, centrifugation, decantation or other suitable means. The temperature to which the oil is cooled is preferably maintained during the separation of the solid components. The resulting winterized peanut oil has especially high stability and exhibits substantially no solid formation at 70° F.

An example is presented to specifically illustrate the invention disclosed herein.

EXAMPLE I

Part A

Three samples of refined peanut oil are hydrogenated to obtain peanut oil compositions of this invention. Each of the samples were hydrogenated at a temperature of 250° F. at a pressure of 20 p.s.i. using 0.1%, by weight of peanut oil, of a nickel catalyst sold under the name of Rufert's catalyst and described in U.S. Pat. 2.424,811. Each of the samples were hydrogenated respectively to an iodine value of 89.6, 83.9 and 79.1 to obtain peanut oil compositions of this invention.

Each of these peanut oil compositions exhibits good stability. While these peanut oil compositions contain some solids at room temperature, the compositions can be easily poured at 70° F.

Part B

Each of the above partially hydrogenated peanut oil compositions were winterized by transferring the composition to a tank fitted with cooling coils. The temperature of the oil was gradually lowered to a desirable temperature, and when the desired temperature was obtained the oil was held at the temperature for a period of time. The particular temperature and period of time employed in the operation for each sample and the solids obtained were as follows:

| Peanut oil composition | Temperature, °F. | Holding time, hrs. | Solids yield, percent |
|---|---|---|---|
| I.V.: | | | |
| 89.6 | 53 | 41 | 2.5 |
| 83.6 | 63 | 60 | 3.4 |
| 79.1 | 65.5 | 48 | 8.5 |

At the end of the holding time, each of the peanut oil compositions was filtered under air pressure to remove the crystallized solid portion of the mixture. Each of the resulting liquid oils is a high stability liquid peanut oil which has excellent stability and exhibits substantally no soilds formation during prolonged storage at 70° F.

What is claimed is:

1. A process for obtaining a high stability liquid peanut oil comprising (1) partially hydrogenating peanut oil to an iodine value of from about 78 to 90; (2) cooling the partially hydrogenated peanut oil over a period of from about 12 hours to 72 hours to a temperature of from 50° F. to 70° F.; and (3) separating the resulting crystals to obtain a high stability liquid peanut oil.

2. The process of claim 1 wherein the peanut oil is hydrogenated at a temperature of from 200° F. to 250° F.

3. The process of claim 1 wherein the peanut oil is partially hydrogenated to an iodine value of from about 80 to 85.

4. The process of claim 1 wherein the cooled peanut oil is held at the temperature to which it is cooled for a period of from about 6 hours to 72 hours.

5. The process of claim 1 wherein the partially hydrogenated peanut oil is slowly stirred during cooling.

References Cited

UNITED STATES PATENTS

| 1,483,155 | 2/1924 | Boyce | 260—409 X |
| 3,394,014 | 7/1968 | Simmons et al. | 99—118 |
| 3,443,967 | 5/1969 | Teasdale | 99—118 |
| 3,674,821 | 7/1972 | Gooding et al. | 260—409 |

OTHER REFERENCES

Bailey et al.: Oil & Soap 20, 129–32 (1943).

LEWIS GOTTS, Primary Examiner

D. G. RIVERS, Assistant Examiner

U.S. Cl. X.R.

260—428; 99—118 R